(12) United States Patent
Adams et al.

(10) Patent No.: US 12,525,415 B2
(45) Date of Patent: Jan. 13, 2026

(54) SWITCHING SYSTEM WITH FUSE ISOLATION

(71) Applicant: Eaton Intelligent Power Limited, Dublin (IE)

(72) Inventors: James Windelon Adams, Chatsworth, GA (US); Brian Scott Bradley, Cleveland, TN (US)

(73) Assignee: Eaton Intelligent Power Limited, Dublin (IE)

( * ) Notice: Subject to any disclaimer, the term of this patent is extended or adjusted under 35 U.S.C. 154(b) by 147 days.

(21) Appl. No.: 18/209,634

(22) Filed: Jun. 14, 2023

(65) Prior Publication Data
US 2024/0420903 A1 Dec. 19, 2024

(51) Int. Cl.
| | |
|---|---|
| H01H 9/26 | (2006.01) |
| H01H 21/16 | (2006.01) |
| H01H 21/22 | (2006.01) |
| H01H 21/42 | (2006.01) |

(52) U.S. Cl.
CPC ............ *H01H 21/165* (2013.01); *H01H 9/26* (2013.01); *H01H 21/22* (2013.01); *H01H 21/42* (2013.01)

(58) Field of Classification Search
CPC ........ H01H 21/165; H01H 9/26; H01H 21/22; H01H 21/42
See application file for complete search history.

(56) References Cited

U.S. PATENT DOCUMENTS

| | | | | |
|---|---|---|---|---|
| 3,705,280 A | * | 12/1972 | Harms | H01H 9/26 200/50.33 |
| 4,778,959 A | | 10/1988 | Sabatella et al. | |
| 5,648,646 A | * | 7/1997 | Flegel | H01H 9/26 335/8 |
| 5,763,844 A | * | 6/1998 | Seymour | H01H 9/26 219/69.16 |
| 6,320,143 B1 | | 11/2001 | Greer | |
| 6,872,900 B1 | * | 3/2005 | Lament | H01H 9/26 200/50.32 |
| 2014/0078793 A1 | * | 3/2014 | Sivakumar | H02M 7/00 363/55 |
| 2019/0139725 A1 | | 5/2019 | Esther et al. | |

OTHER PUBLICATIONS

Safety Switches, Design Guide, Publication No. DG008001EN / Z25662, Nov. 2021.

* cited by examiner

*Primary Examiner* — Jacob R Crum
(74) *Attorney, Agent, or Firm* — DiBerardino McGovern IP Group LLC

(57) ABSTRACT

A switching system includes: a first switching apparatus; a second switching apparatus; a holding assembly between the first switch apparatus and the second switch apparatus, the holding assembly configured to hold one or more fuse devices; and a linking interface connected to the first switching apparatus and the second switching apparatus, the linking interface having only two stable interface positions: a first interface position and a second interface position. Transitioning the linking interface from the first interface position to the second interface position simultaneously changes the state of the first switching apparatus and a state of the second switching apparatus.

17 Claims, 11 Drawing Sheets

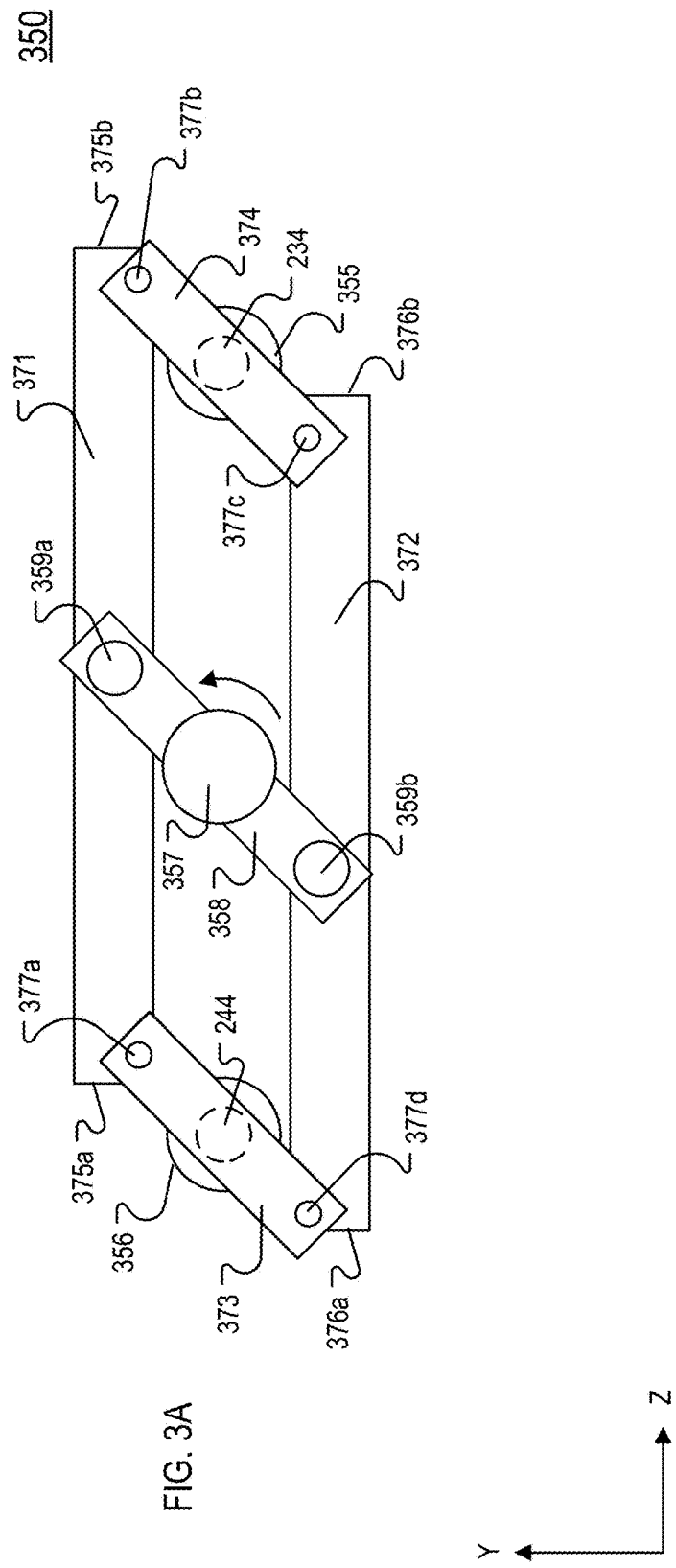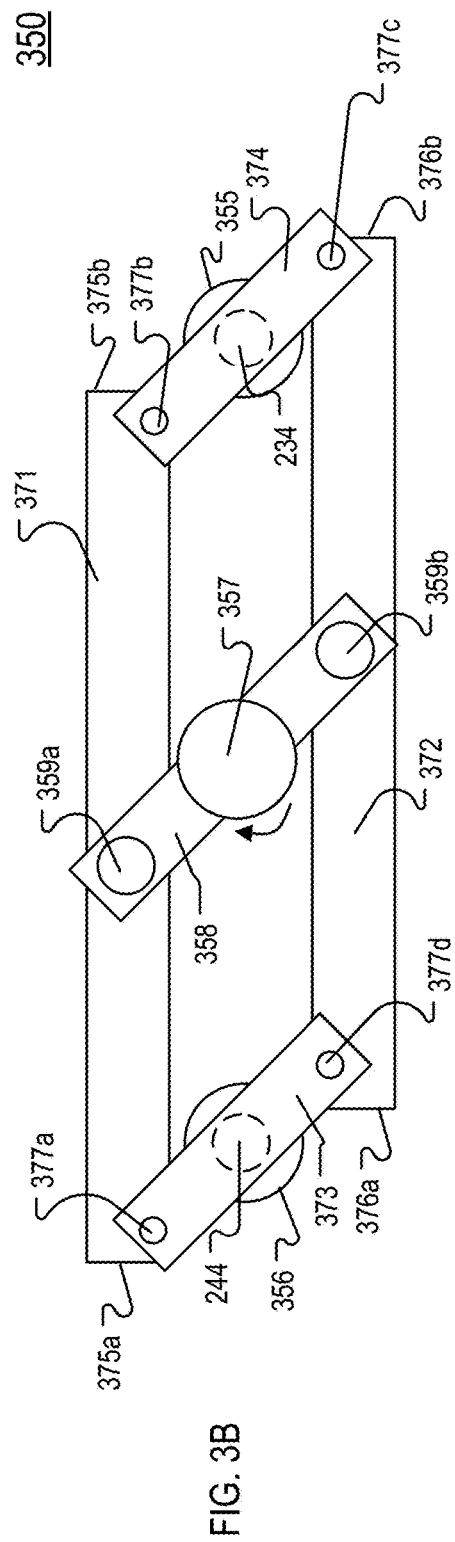
FIG. 3A
FIG. 3B

410

SWITCHING SYSTEM WITH FUSE ISOLATION

TECHNICAL FIELD

This disclosure relates to a switching system with fuse isolation.

BACKGROUND

A safety switch has an ON state in which electrical current is able to flow through the safety switch and an OFF state in which electrical current cannot flow through the safety switch.

SUMMARY

In one aspect, a switching system includes: a first switching apparatus; a second switching apparatus; a holding assembly between the first switch apparatus and the second switch apparatus, the holding assembly configured to hold one or more fuse devices; and a linking interface connected to the first switching apparatus and the second switching apparatus, the linking interface having only two stable interface positions: a first interface position and a second interface position. Transitioning the linking interface from the first interface position to the second interface position simultaneously changes the state of the first switching apparatus and a state of the second switching apparatus.

Implementations may include one or more of the following features.

The switching system also may include a switch control coupled to the linking interface, and the switch control may be operable to transition the linking interface between the two stable interface positions. The switch control may include a handle that is moveable between two stable handle positions: a first handle position and a second handle position, and, in these implementations, moving the handle from the first handle position to the second handle position transitions the linking interface from the first interface position to the second interface position, and moving the handle from the second handle position to the first handle position transitions the linking interface from the second interface position to the first interface position. The linking interface also may include: a first hub coupled to the first switching apparatus, a second hub coupled to the second switching apparatus, and a middle hub coupled to the handle; and a link assembly coupled to the first hub, the second hub, and the middle hub. The link assembly also may include a first link and a second link; and each of the first link and the second link may extend from a first end to a second end. The first link and the second link may extend parallel to each other. The linking interface also may include: a third connector connected to the first end of the first link at a first pivot point and to the first end of the second link at a second pivot point, and a fourth connector connected to the second end of the first link at a third pivot point and to the second end of the second link at a fourth pivot point. The first hub may be coupled to the third connector, and the second hub may be coupled to the fourth connector.

In some implementations, each of the first switching apparatus and the second switching apparatus includes one or more double make, double break switches. Each of the double make, double break switch may include a shaft that rotates in response to movement of the linking interface and two blades mounted on the shaft.

The switching system also may include an electrically conductive piece electrically connected to the holding assembly.

The first switching apparatus and the second switching apparatus may be in an ON state when the interface is in the first interface position; and the first switching apparatus and the second switching apparatus may be in an OFF state when the interface is in the second interface position.

The first switching apparatus and the second switching apparatus may be in an OFF state when the interface is in the first interface position; and the first switching apparatus and the second switching apparatus may be in an ON state when the interface is in the second interface position.

The switching apparatus also may include a housing that encloses the first switching apparatus, the second switching apparatus, the holding assembly, and the linking interface.

The switching apparatus also may include a support. The first switching apparatus, the second switching apparatus, and the holder may be mounted to the support.

The switching apparatus also may include at least one fuse device.

The holding assembly may include one or more fuse clips, each fuse clip configured to hold one fuse device.

In another aspect, a method includes: electrically connecting a fused single-throw safety switch to an electrical device configured to consume and produce electricity, the fused single-throw safety switch including one or more fuses; and transitioning an interface of the fused single-throw safety switch from an ON state to an OFF state to isolate the one or more fuses regardless of whether the electrical device is consuming or producing electricity.

Implementations may include one or more of the following features. Transitioning the interface may include moving a handle through a range of motion from a first endpoint to a second endpoint. In these implementations, the handle is only stationary at the first endpoint and the second endpoint, the fused single-throw safety switch is in the ON state when the handle is at the first endpoint, and fused single-throw safety switch is in the OFF state when the handle is at the second endpoint.

In another aspect, a single-throw safety switch includes: an operating interface configured to control a first switching apparatus and a second switching apparatus simultaneously; and a fuse holder between the first switching apparatus and the second switching apparatus. The operating interface configured to control whether the single-throw safety switch is in an ON state or an OFF state; and, when the single-throw safety switch is in the OFF state, the first switching apparatus and the second switching apparatus are OFF and the fuse holder is electrically isolated on two sides.

Implementations may include one or more of the following features.

The operating interface may include a handle that has only two stable stationary positions.

The fuse holder may include three fuse clips, each configured to hold on fuse, and each of the first switching apparatus and the second switching apparatus may include three sub-switch assemblies electrically connected to one of the three fuse clips.

Implementations of any of the techniques described herein may include an apparatus, a device, a system, and/or a method. The details of one or more implementations are set forth in the accompanying drawings and the description below. Other features will be apparent from the description and drawings, and from the claims.

DRAWING DESCRIPTION

FIGS. 3A and 3B are side views of an example of a linking interface.

DETAILED DESCRIPTION

Figure 1:
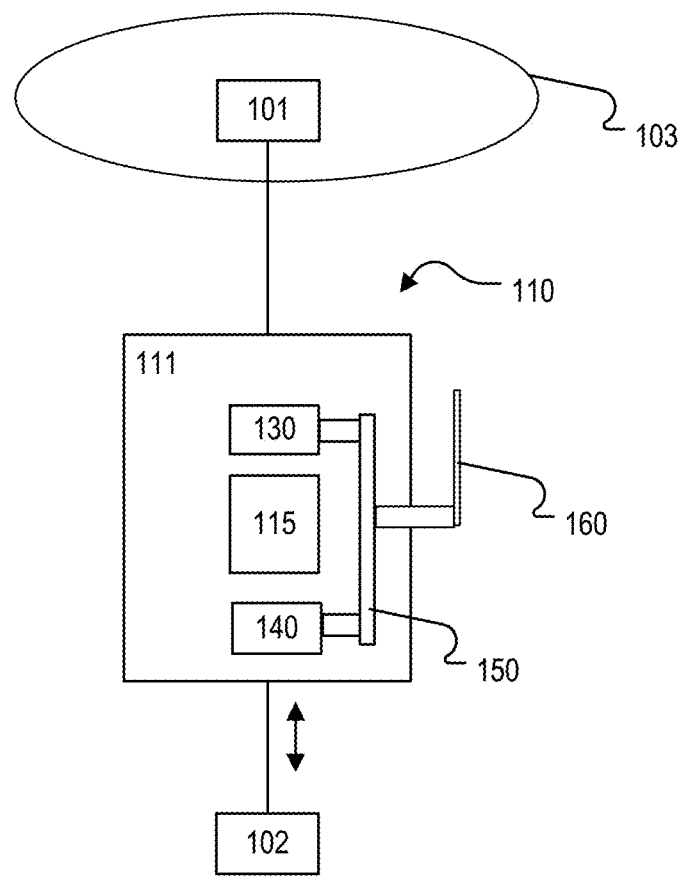
FIG. 1 is a block diagram of an example of a switching system.

FIG. 1 is a block diagram of a switching system 110 that is between a source 101 and a load 102. The switching system 110 is a single-throw safety switch. The switching system 110 includes a fuse holding assembly 115 between a source-side switching apparatus 130 and a load-side switching apparatus 140. As discussed below, this configuration facilitates reliable and complete electrical isolation of the fuse holding assembly 115 even under bi-directional power flow conditions.

The switching system 110 has two states: an ON or closed state in which the switching system 110 electrically connects the source 101 and the load 102, and an OFF or opened state in which the switching system 110 disconnects the load 102 from the source 101. Each switching apparatus 130 and 140 also has two states: (i) ON or closed in which current may flow and (ii) OFF or opened in which current cannot flow. When the switching apparatuses 130 and 140 are in the ON state, the switching system 110 is closed. When the switching apparatuses 130 and 140 are in the OFF state, the switching system 110 is opened. The switching system 110 also includes a two-position or two-state operating interface 160 that is coupled to the linking interface 150. The operating interface 160 drives the linking interface 150 and determines the state of the switching apparatuses 130 and 140 and the switching system 110.

Traditional fused single-throw safety switches include only one switching apparatus and are generally installed such that the one switching apparatus is between a power source and a fuse assembly in the safety switch. Such a design relies on the assumption that power flows in only one direction and that opening the single switching apparatus is sufficient to electrically isolate the fuse assembly. However, in instances in which the load (and/or a device downstream of the load) is capable of generating electricity, electrical current can flow in two directions through the safety switch. Under bi-directional current conditions, opening the one switching apparatus to turn the traditional safety switch OFF is not necessarily sufficient to electrically isolate the fuse assembly. For example, if the load is generating electricity, current can still flow into the fuse assembly from the load even if the one switching apparatus is open on the source side.

On the other hand, in the switching system 110, the fuse holding assembly 115 is between the source-side switching apparatus 130 and the load-side switching apparatus 140. The switching apparatuses 130 and 140 are coupled by the linking interface 150 such that the switching apparatuses 130 and 140 change state simultaneously when the two-position or two-state operating interface 160 is transitioned from one position or state to the other. In this way, current flow to the fuse holding assembly 115 from the load 102 and/or from the source 101 is reliably interrupted by a single operation of the operating interface 160. Thus, in the switching system 110, transitioning the operating interface 160 such that the switching system 110 is OFF also electrically isolates the fuse holding assembly 115 even under bi-directional power flow conditions.

Furthermore, the switching system 110 is a compact, single-unit device that may be enclosed in a housing 111 that is the same or a similarly sized housing as a traditional single-throw safety switch. Thus, the switching system 110 takes up less space than an arrangement in which a traditional single-throw safety switch is used in an improvised arrangement with one or more external load-side switches. Additionally, such improvised arrangements also lack a coupling between the components of the traditional single-throw safety switch and the external load-side switching devices, making simultaneous operation impracticable or impossible.

Before discussing example implementations of the switching system 110 in more detail, an overview of various components of the source 101, the load 102, and the system 110 is provided.

The source 101 is any kind of AC power source. For example, the source 101 may be a generator, a power plant, a distributed energy resource (DER), or a node or feeder in an AC power grid. A DER is an electricity-producing resource and/or a controllable load. Examples of DERs include, without limitation, solar-based energy sources such as, for example, solar panels and solar arrays; wind-based energy sources, such as, for example, wind turbines and windmills; combined heat and power plants; rechargeable sources (such as batteries); natural gas-fueled generators; electric vehicles; and controllable loads, such as, for example, some heating, ventilation, air conditioning (HVAC) systems and electric water heaters.

The load 102 is any device or system that consumes, absorbs, and/or produces electrical power. For example, the load 102 may be a motor; a lighting system; a distributed energy resource (DER); an uninterruptable power supply, a capacitor, a power-factor correction device (such as a capacitor bank), or a transformer. The load 102 may be located at a customer site, such as, for example, a residence or an industrial facility. The load 102 may include more than one device.

In the example of FIG. 1, the source 101 is part of a grid or electrical power distribution network 103. The electrical power distribution network 103 may be, for example, a multi-phase electrical power grid that provides electricity to industrial, commercial, and/or residential customers. The AC electrical power distribution network 103 distributes AC electrical power that has a fundamental frequency of, for example, 50 or 60 Hertz (Hz). The AC electrical power distribution network 103 may be low-voltage (for example, up to 1 kilovolt (kV)), medium-voltage or distribution voltage (for example, between 1 kV and 35 kV), or high-voltage (for example, 35 kV and greater). The distribution network 103 may include more than one sub-grid or portion. For example, the distribution network 103 may include AC micro-grids, AC area networks, or AC spot networks that serve particular customers. These sub-grids may be connected to each other via switches and/or other devices to form the network 103. Moreover, sub-grids within the network 103 may have different nominal voltages. For example, the network 103 may include a medium-voltage portion connected to a low-voltage portion through a distribution transformer. All or part of the network 103 may be underground. The network 103 may include additional components and devices such as, for example, one or more transmission lines, distribution lines, power distribution or substation transformers, electrical cables, and/or any other mechanism for transmitting electricity.

Each switching apparatus 130 and 140 is any type of switch that has two states (ON and OFF). For example, each switching apparatus 130 and 140 may be a double make, double break switch that includes a moveable conductor and two stationary contacts. The moveable conductor is separated from the stationary contacts to open the switch and joined to the stationary contacts to close the switch. Other implementations are possible. For example, each switching apparatus 130 and 140 may be a rotary switch.

Each switching apparatus 130 and 140 may include one switch for each of a plurality of phases such that the switching system 110 is a multi-phase safety switch. Each switching apparatus 130 and 140 is capable of interrupting current having an amplitude that is appropriate for the rating of the switching system 110. The rating of the switching system 110 may be, for example, 30 Amperes (A), 60A, 100A, 200A, or greater.

The fuse holding assembly 115 is any type of assembly that holds fuses. For example, the fuse holding assembly 115 may be one or more fuse clips. The fuse holding assembly 115 may be configured to allow removal and replacement of a fuse that has operated. The switching system 110 may be shipped or transported without the fuses and the fuses may be installed by the end-user or manufacturer.

The operating interface 160 is any type of interface that has two stable states or positions and is accessible from an exterior of the housing 111. For example, the operating interface 160 may be a handle that moves through a range of motion between two endpoints and is only stationary at the endpoints. Each of the two stable states or positions of the operating interface 160 corresponds to one of two stable positions of the linking interface 150 and one of the two operating states of the switching system 110.

Figure 2A:
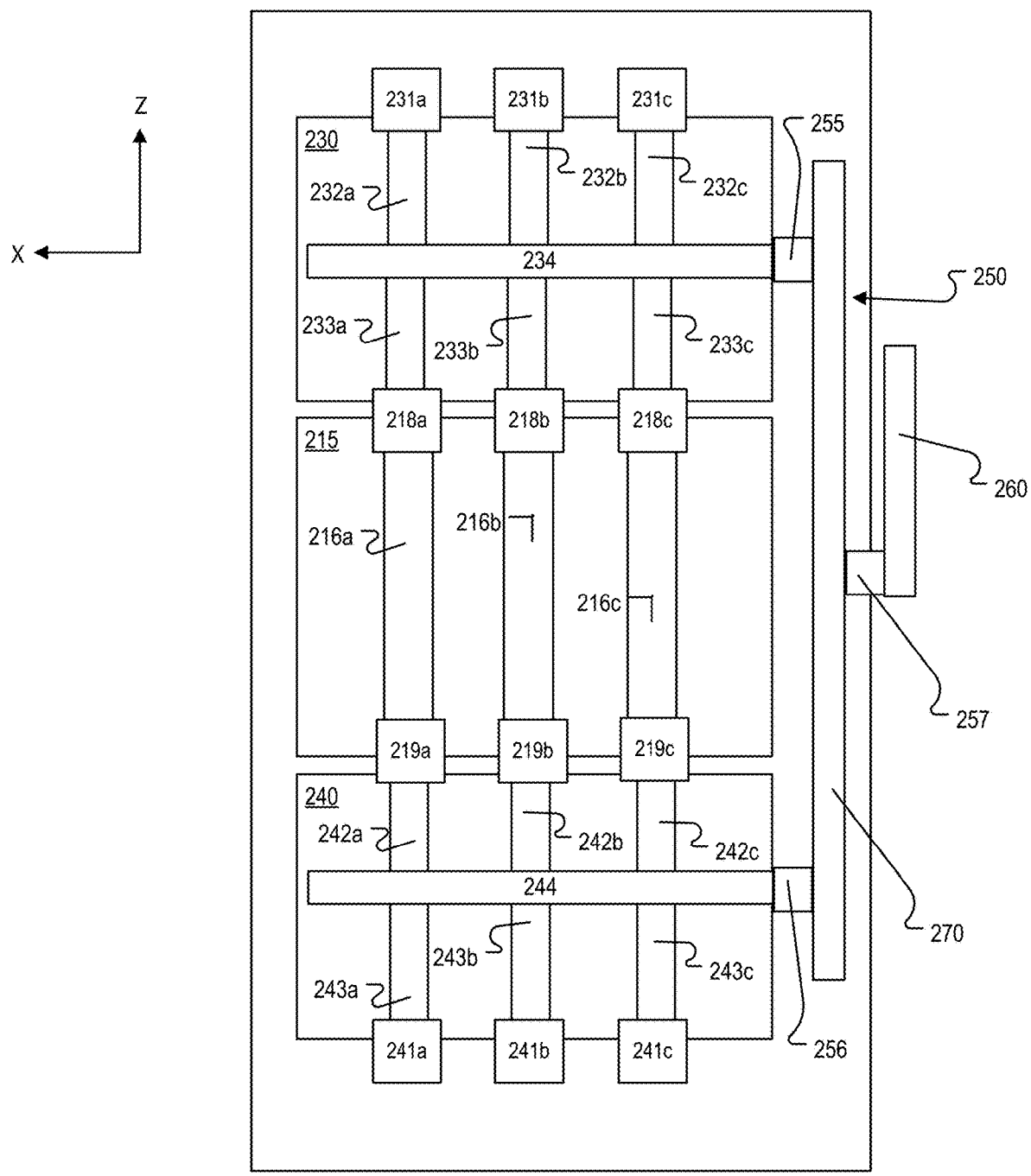
FIG. 2A is a front block diagram of an example of a switching system in the closed state.
Figure 4A:
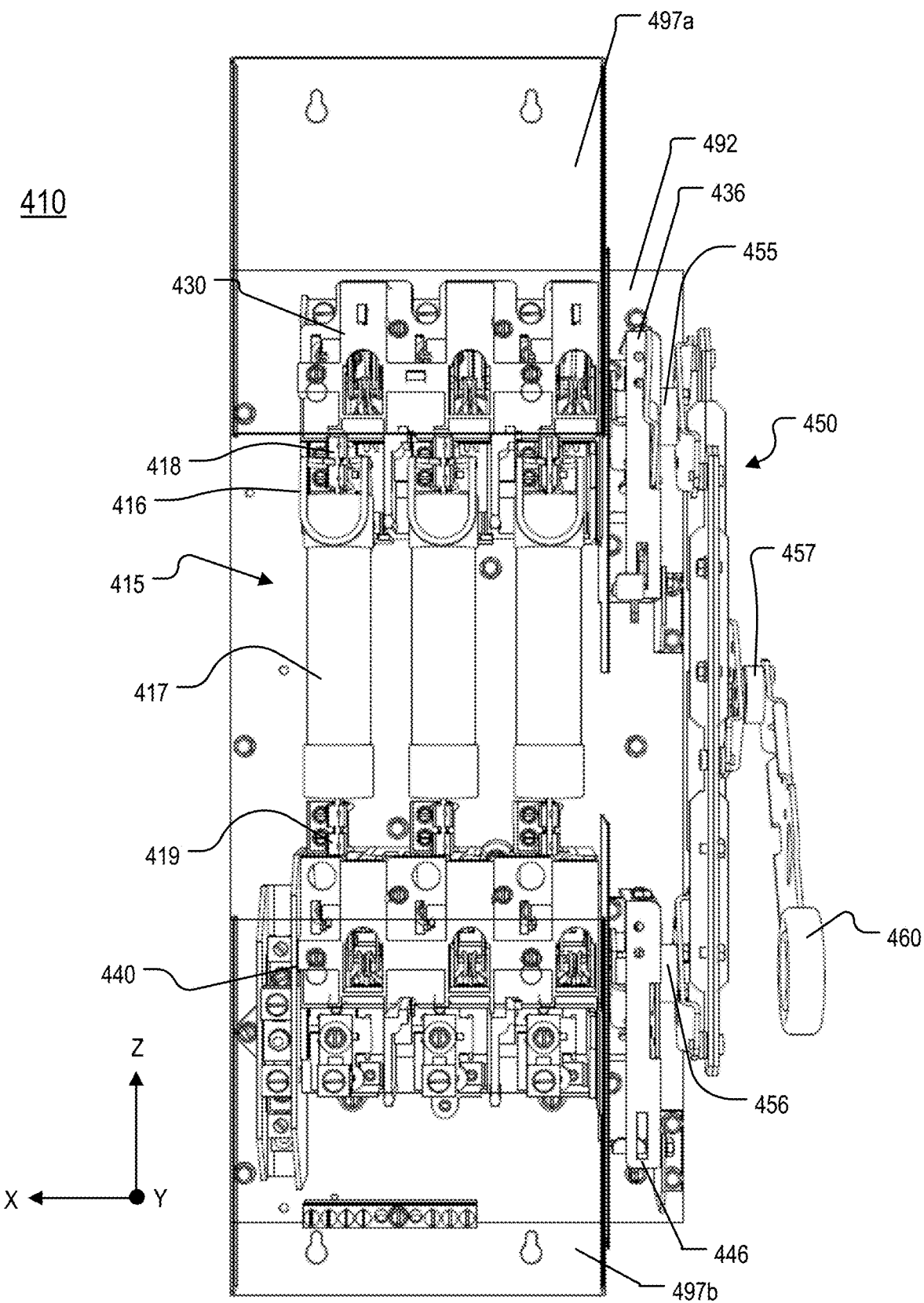
FIGS. 4A-4D show various views of another example of a switching system.

FIG. 2A is a front block diagram of a switching system 210 in the closed state. The switching system 210 is an example implementation of the switching system 110. The switching system 210 includes a fuse holding assembly 215 between a source-side switching apparatus 230 and a load-side switching apparatus 240. The fuse holding assembly 215 includes three fuse mounts 216a, 216b, 216c that are each configured to hold a fuse device (not shown in FIG. 2A). The fuse device may be, for example, a cartridge fuse such as shown in FIG. 4A. Each fuse mount 216a, 216b, 216c is configured to hold one fuse device. For example, each fuse mount 216a, 216b, 216c may be a fuse clip. Each fuse mount 216a, 216b, 216c includes a respective first electrically conductive contact 218a, 218b, 218c and a respective second electrically conductive contact 219a, 219b, 219c. The contacts 218a, 218b, 218c and 219a, 219b, 219c may be made of any electrically conductive material, for example, a metal such as copper or brass.

The source-side switching apparatus 230 is a double-make, double-break switch. The source-side switching apparatus 230 includes a rotatable shaft 234; first moveable contacts 232a, 232b, 232c mounted on the shaft 234; and second moveable contacts 233a, 233b, 233c mounted on the shaft 234 and electrically connected to a respective first moveable contact 232a, 232b, 232c. The first moveable contacts 232a, 232b, 232c and the second moveable contacts 233a, 233b, 233c extend radially from the shaft 234 in opposite directions. In some implementations, the first moveable contact 232a and the second moveable contact 233a are formed from a single conductive piece that passes through and is held in the shaft 234. Similarly, the moveable contacts 232b and 233b may be a second single conductive piece, and the moveable contacts 232c and 233c may be a third single conductive piece. In these implementations, the source-side switching apparatus 230 includes the shaft 234 and three distinct conductive rods that extend through the shaft 234. In other implementations, each first moveable contact 232a, 232b, 232c is distinct from its respective second contact 233a, 233b, 233b. For example, each first moveable contact 232a, 232b, 232c and each second moveable contact 233a, 233b, 233c may be a distinct electrically conductive blade.

The load-side switching apparatus 240 is also a double-make, double-break switch. The load-side switching apparatus 240 includes a rotatable shaft 244; first moveable contacts 242a, 242b, 242c mounted on the shaft 244; and second moveable contacts 243a, 243b, 243c mounted on the shaft 244. The first moveable contacts 242a, 242b, 242c and the second moveable contacts 243a, 243b, 243c extend radially from the shaft 244 in opposite directions. In some implementations, the first moveable contact 242a and the second moveable contact 243a are formed from a single conductive piece that passes through and is held in the shaft 244. Similarly, the moveable contacts 242b and 243b may be a second single conductive piece, and the moveable contacts 242c and 243c may be a third single conductive piece. In these implementations, the load-side switching apparatus 240 includes the shaft 244 and three distinct metal rods that extend through the shaft 244. In other implementations, each first moveable contact 242a, 242b, 242c is distinct from its respective second contact 243a, 243b, 243c. For example, each first moveable contact 242a, 242b, 242c and each second moveable contact 243a, 243b, 243c may be an electrically conductive blade.

The switching system 210 also includes a linking interface 250. The linking interface 250 drives the shafts 234 and 244 simultaneously such that the state of the source-side switching apparatus 230 and the state of the load-side switching apparatus 240 change simultaneously. The linking interface 250 includes a first hub 255 that is coupled to the shaft 234 and a link assembly 270, a second hub 256 that is coupled to the shaft 244 and the link assembly 270, and an interface hub 257 that is coupled to the link assembly 270 and an operating handle 260.

FIG. 2A shows the switching system 210 in the closed state. A source-side terminal 231a is electrically connected to the moveable contact 232a, which is electrically connected to the moveable contact 233a. The moveable contact 233a is electrically connected to the contact 218a of the fuse mount 216a. Similarly, a source-side terminal 231b is electrically connected to the moveable contacts 232b and 233b and the contact 218b, and a source-side terminal 231c is electrically connected to the moveable contacts 232c and 233c and the contact 218c. Thus, the source-side switching apparatus 230 is electrically connected to the fuse holding assembly 215.

The load-side switching apparatus 240 is electrically connected to the fuse holding assembly 215 as follows. A load-side terminal 241a is electrically connected to the moveable contacts 243a and 242a and to the contact 219a of the fuse mount 216a. A load-side terminal 241b is electrically connected to the moveable contacts 242b and 243b and the contact 219b, and a load-side terminal 241c is electrically connected to the moveable contacts 242c and 243c and the contact 219c. When fuse devices are inserted into the fuse mounts 216a, 216b, 216c, each first fuse mount contact 218a, 218b, 218c is electrically connected to a respective second fuse mount contact 219a, 219b, 219c and current can flow through the switching system 210.

The source-side terminals 231a, 231b, 231c and the load-side terminals 241a, 241b, 241c may be any type of electrical terminal that is configured for connection to an external electrical device. For example, the source-side terminals 231a, 231b, 231c and the load-side terminals 241a, 241b, 241c may be lugs or other cable connectors that electrically connect to cables or electrical wires. In some implementations, the load-side terminals 241a, 241b, 241c are formed from a conductive piece, such as a copper piece, instead of from a lug or traditional cable connector.

In operational use, fuse devices are installed in the fuse holding assembly 215, and the switching system 210 is installed by electrically connecting a source to the source-side switching apparatus 230 and a load to the load-side switching apparatus 240. For example, each source-side terminal 231a, 231b, 231c may be connected to one phase of a three-phase source; and each load-side terminal 241a, 241b, 241c may be connected to one phase of a three-phase load. While the switching system 210 is closed (as shown in FIG. 2A), current is able to flow through the switching system 210 and the fuse holding assembly 215 is not electrically isolated.

Figure 2B:
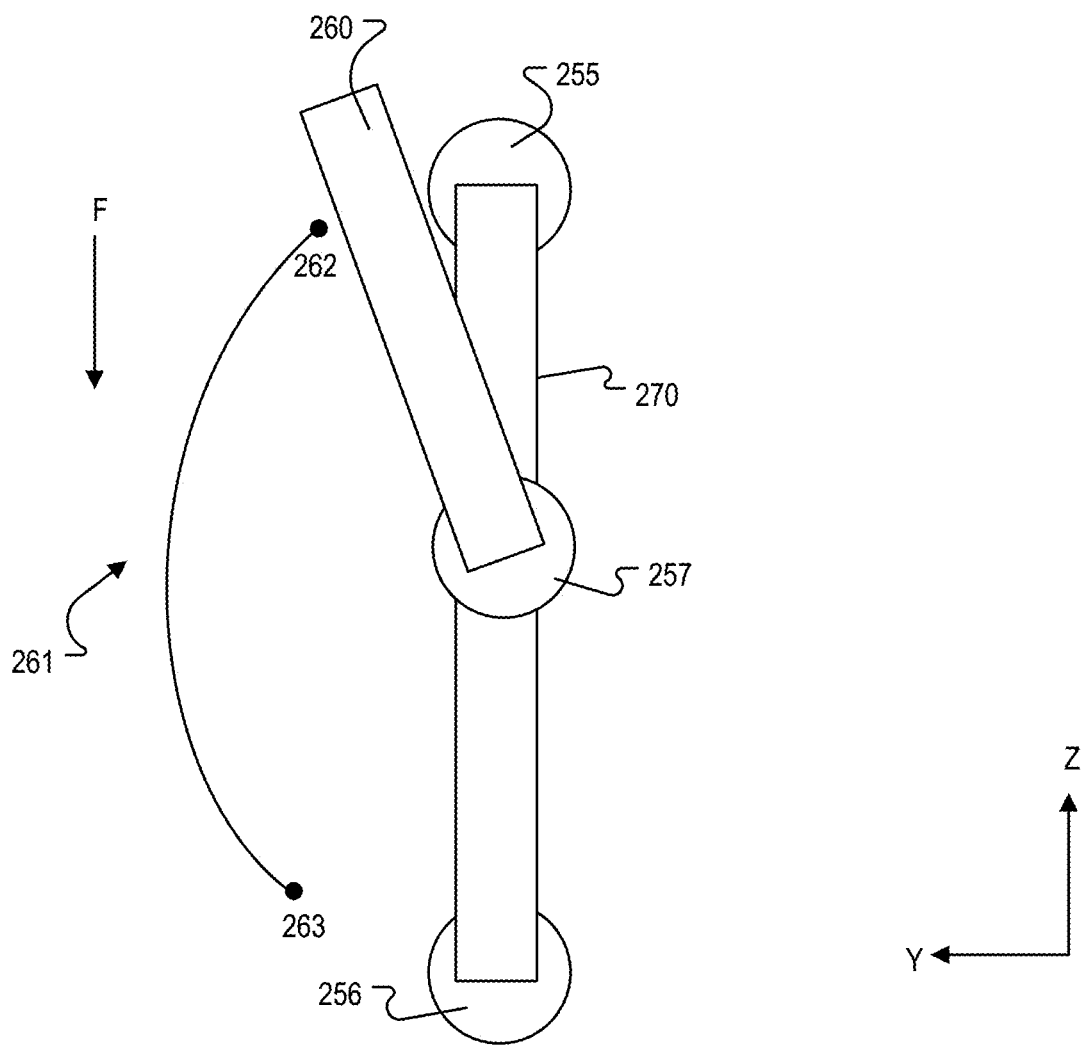
FIG. 2B is a side view of an example of an operating handle and a link assembly.
Figure 2D:
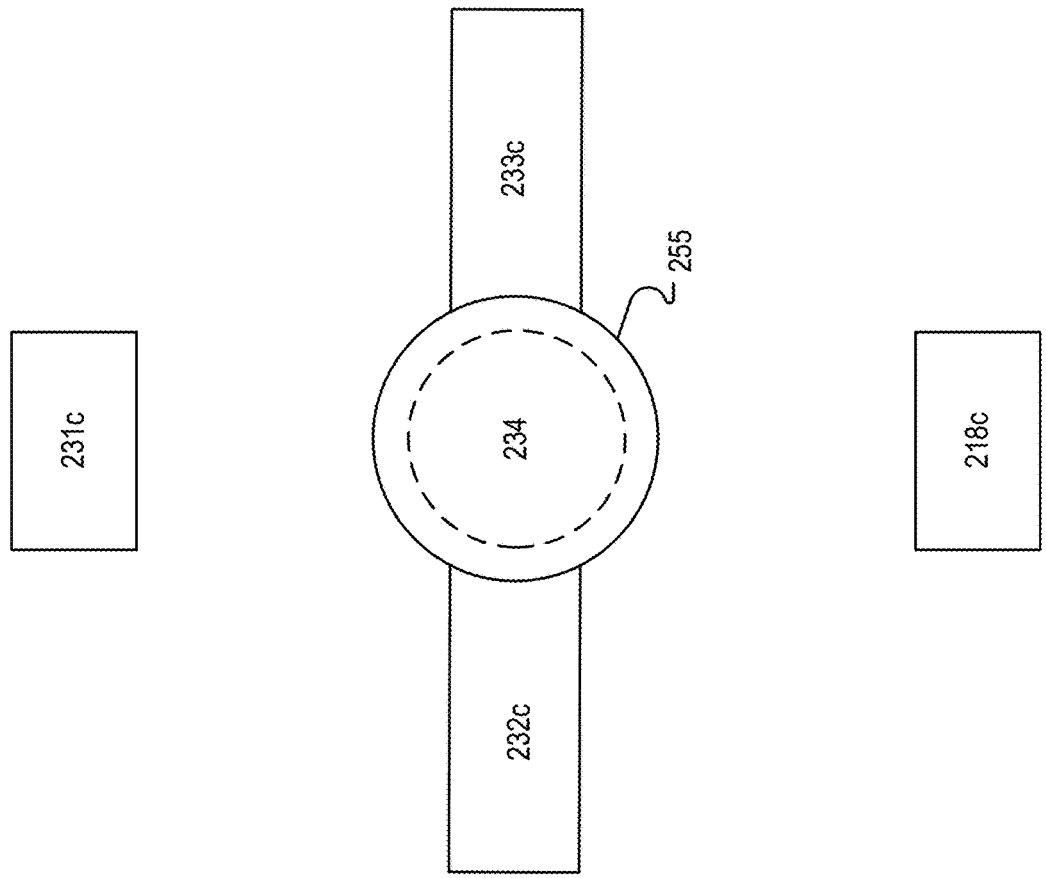
FIGS. 2C and 2D are side views of an example of a hub and shaft.
Figure 2C:
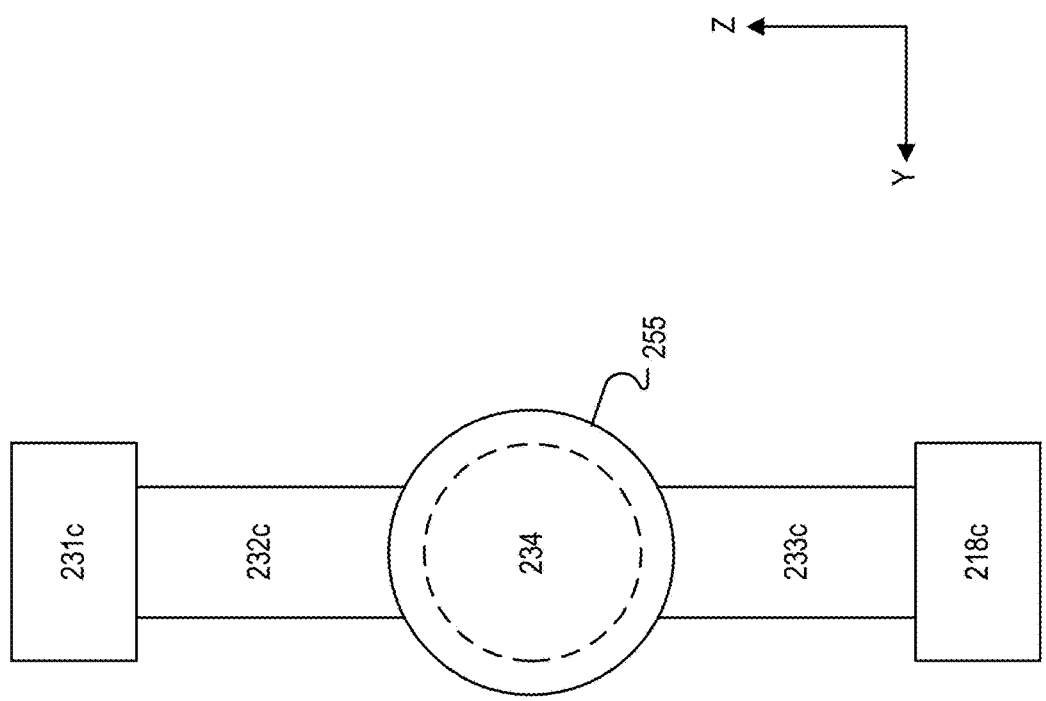

Referring also to FIGS. 2B-2D, the transition from the closed state to the opened state is discussed next. FIG. 2B is a side view of the operating handle 260 and the link assembly 270. The operating handle 260 has a range of motion that is defined by an arc 261. The arc 261 has a first endpoint 262 and a second endpoint 263. The operating handle 260 is a two-position handle that is only stationary and stable at the endpoints 262 and 263. In other words, when the operating handle 260 moves from one of the endpoints 262, 263 to the other endpoint, the operating handle 260 does not come to a stop at an intermediate point along the arc 261. To transition the operating handle 260 from the first stable position shown in FIG. 2B, a force F is applied until the operating handle 260 moves along the arc 261. Once the operating handle 260 moves from the first endpoint 262, it does not stop until it reaches the second endpoint 263.

The operating handle 260 is coupled to the interface hub 257, which is coupled to the link assembly 270. The link assembly 270 is coupled to the first hub 255 and the second hub 256. When the force F is applied to the operating handle 260, the operating handle 260 moves along the arc 261 from the first endpoint 262 to the second endpoint 263. As the operating handle 260 moves along the arc 261, the handle 260 rotates the interface hub 257 in the counterclockwise direction. The counterclockwise rotation of the interface hub 257 moves the link assembly 270 in the Z direction. The linear motion of the link assembly 270 causes the first hub 255 and the second hub 256 to rotate in the counterclockwise direction at the same time such that the shafts 234 and 244 to also rotate in the counterclockwise direction. The rotation of the shaft 234 rotates the moveable contacts 232a, 233a; 232b, 233b; 232c, 233c so that the moveable contacts separate from their respective stationary contacts 231a, 218a; 231b, 218b; 231c, 218c and the source-side switching apparatus 230 opens. The rotation of the shaft 244 rotates the moveable contacts 242a, 243a; 242b, 243b; 242c, 243c so that the moveable contacts separate from their respective stationary contacts 241a, 219a; 241b, 219b; 241c, 219c and the load-side switching apparatus 240 opens. The simultaneous rotation of the shafts 234 and 244 opens the source-side switching apparatus 230 and the load-side switching apparatus 240 at the same time.

FIG. 2C and FIG. 2D illustrate the opening of the switching apparatus 230 in more detail. FIG. 2C is a side view of the first hub 255 and the shaft 234 when the source-side switching apparatus 230 is closed. FIG. 2D is a side view of the first hub 255 and the shaft 234 when the source-side switching apparatus 230 is opened. Referring to FIG. 2C, as the operating handle 260 moves through the arc 261, the first hub 255 rotates in the counterclockwise direction, causing the shaft 234 to also rotate in the counterclockwise direction. The moveable contacts 232c and 233c are mounted to the shaft 234 and rotate in the counterclockwise direction with the shaft 234. As the shaft 234 rotates, the moveable contact 232c separates from the source-side terminal 231c, and the moveable contact 233c separates from the fuse holder contact 218c. The first hub 255 and the shaft 234 continue to rotate counterclockwise until the operating handle reaches the endpoint 263 and the shaft 234 is stationary in the opened position shown in FIG. 2D. Although not shown in FIGS. 2C and 2D, the other contacts on the shaft 234 also rotate in the counterclockwise direction in the same manner.

The load-side switching apparatus 240 is opened in the same manner. The link assembly 270 rotates the second hub 256 at the same time and in the same direction as the first hub 255 such that the load-side switching apparatus 240 and the source-side switching apparatus 230 open at the same time. Thus, the source-side switching apparatus 230 and the load-side switching apparatus 240 are opened simultaneously by moving the operating handle 260 from the first endpoint 262 to the second endpoint 263.

When the source-side switching apparatus 230 and the load-side switching apparatus 240 are opened, the contacts 218a, 218b, 218c are electrically isolated from the source and the contacts 219a, 219b, 219c are electrically isolated from the load, and the fuse holding assembly 215 may be safely serviced. For example, fuse devices may be inserted into and/or removed from the fuse holding assembly 215 when the fuse holding assembly 215 is electrically isolated.

The switching system 210 is closed by following the same procedure in reverse order. The operating handle 260 is moved from the second endpoint 263 to the first endpoint 262, causing the interface hub 257 to rotate in the clockwise direction and translating the link assembly 270 linearly along the −Z direction. The first hub 255 and the second hub 256 rotate in the clockwise direction, causing the shafts 234 and 244 to rotate in the clockwise direction and to return to a configuration such as shown in FIG. 2C such that the source-side switching apparatus 230 and the load-side switching apparatus 240 are closed at the same time.

In the example discussed above, the first endpoint 262 of the operating handle 260 corresponds to the closed state of the switching system 210 and the second endpoint 263 corresponds to the opened state of the switching apparatus. However, other implementations are possible. For example, the first endpoint 262 may correspond to the opened state of the switching system 210 and the second endpoint 263 may correspond to the closed state.

FIGS. 3A and 3B are side views of a linking interface 350. The linking interface 350 is an example of an implementation of the linking interface 150. The linking interface 350 may be used in the switching system 110 or the switching system 210. In the example of FIGS. 3A and 3B, the linking interface 350 is shown as being mounted to the shafts 234 and 244 of the switching system 210.

The linking interface 350 has only two stable positions: a first position (FIG. 3A) and a second position (FIG. 3B). The linking interface 350 is used to transition a load-side switching apparatus and a source-side switching apparatus from one of two states to the other state simultaneously. For example, when used with the switching system 210, the linking interface 350 opens (or closes) the source-side switching apparatus 230 and the load-side switching apparatus 240 at the same time in response to the operating handle 260 moving from one endpoint of the arc 261 to the other endpoint.

The linking interface 350 includes a first link 371 and a second link 372. The first link 371 extends in the Z direction from a first end 375a to a second end 375b. The second link 372 extends in the Z direction from a first end 376a to a second end 376b. The first link 371 and the second link 372 are parallel to each other and are separated from each other in the Y direction.

The linking interface 350 also includes a third link 373 that extends between the first end 375a and the first end 376a, and a fourth link 374 that extends between the second end 375b and the second end 376b. The third link 373 is connected to the first end 375a at a pivot point 377a and to the first end 376a at a pivot point 377d. The fourth link 374 is connected to the second end 375b at a pivot point 377b and to the second end 376b at a pivot point 377c. The pivot points 377a, 377b, 377c, 377d are any type of connection that allows the elements connected by the pivot point to rotate in the Y-Z plane relative to each other. The links 371, 372, 373, and 374 may be made of any durable, solid material. For example, the links 371, 372, 373, and 374 may be made of steel, plastic, aluminum, a composite material, and/or an alloy.

Each of the third link 373 and the fourth link 374 has a center point at the spatial center of the link. The center point of the third link 373 is mounted to a hub 356. The center point of the fourth link 374 is mounted to a hub 355. The hubs 355 and 356 are configured to be coupled to a shaft of a switching apparatus. In the example of FIGS. 3A and 3B, the hub 355 is coupled to the shaft 234 of the source-side switching apparatus 230 (FIG. 2A), and the hub 356 is coupled to the shaft 244 of the load-side switching apparatus 240 (FIG. 2A). The linking interface 350 also includes an interface hub 357. The interface hub 357 is mounted to a hub plate 358 that is connected to the link 371 at a pivot point 359a and to the link 372 at a pivot point 359b. The interface hub 357 is attached to an operating interface such as the operating handle 260 (FIG. 2A).

FIG. 3A shows the linking interface 350 in the first position. To transition the linking interface 350 to the second position (FIG. 3B), the interface hub 357 is rotated counterclockwise in the Y-Z plane by the operating interface. Rotating the interface hub 357 counterclockwise in the Y-Z plane rotates the hub plate 358 counterclockwise in the Y-Z plane. The hub plate 358 is coupled to the first and second links 371, 372 at the respective pivot points 359a, 359b. The counterclockwise rotation of the hub plate 358 causes the first link 371 to move in the –Z direction and the second link 372 to move in the Z direction. The lateral movement of the first link 371 and the second link 372 in opposite directions causes the third link 373 and the fourth link 374 to rotate counterclockwise, thereby rotating the respective hubs 356 and 355 counterclockwise until the linking interface 350 is in the second position shown in FIG. 3B. The rotation of the hub 356 rotates the switch shaft 244, and the rotation of the hub 355 rotates the switch shaft 234. The switch shafts 244 and 234 are rotated simultaneously.

To return the linking interface 350 from the second position shown in FIG. 3B to the first position shown in FIG. 3A, the operating interface is manipulated to rotate the interface hub 357 clockwise in the Y-Z plane. The clockwise rotation of the interface hub 357 causes the hub plate 358 to rotate clockwise such that the first link 371 moves in the Z direction and the second link 372 moves in the –Z direction. The lateral motion of the first link 371 and the second link 372 rotates the third link 373 (and the hub 356) and the fourth link 374 (and the hub 355) in the clockwise direction at the same time. The clockwise rotation of the hub 356 rotates the shaft 244 in the clockwise direction and the hub 355 rotates the shaft 234 in the clockwise direction.

The first position (FIG. 3A) and the second position (FIG. 3B) are the only two stable positions of the linking interface 350. In other words, when the linking interface 350 is transitioned from the first position to the second position (and vice versa), the links 371, 372, 373, and 374 and the elements connected to the links 371, 272, 373, and 374 move continuously.

Figure 4B:
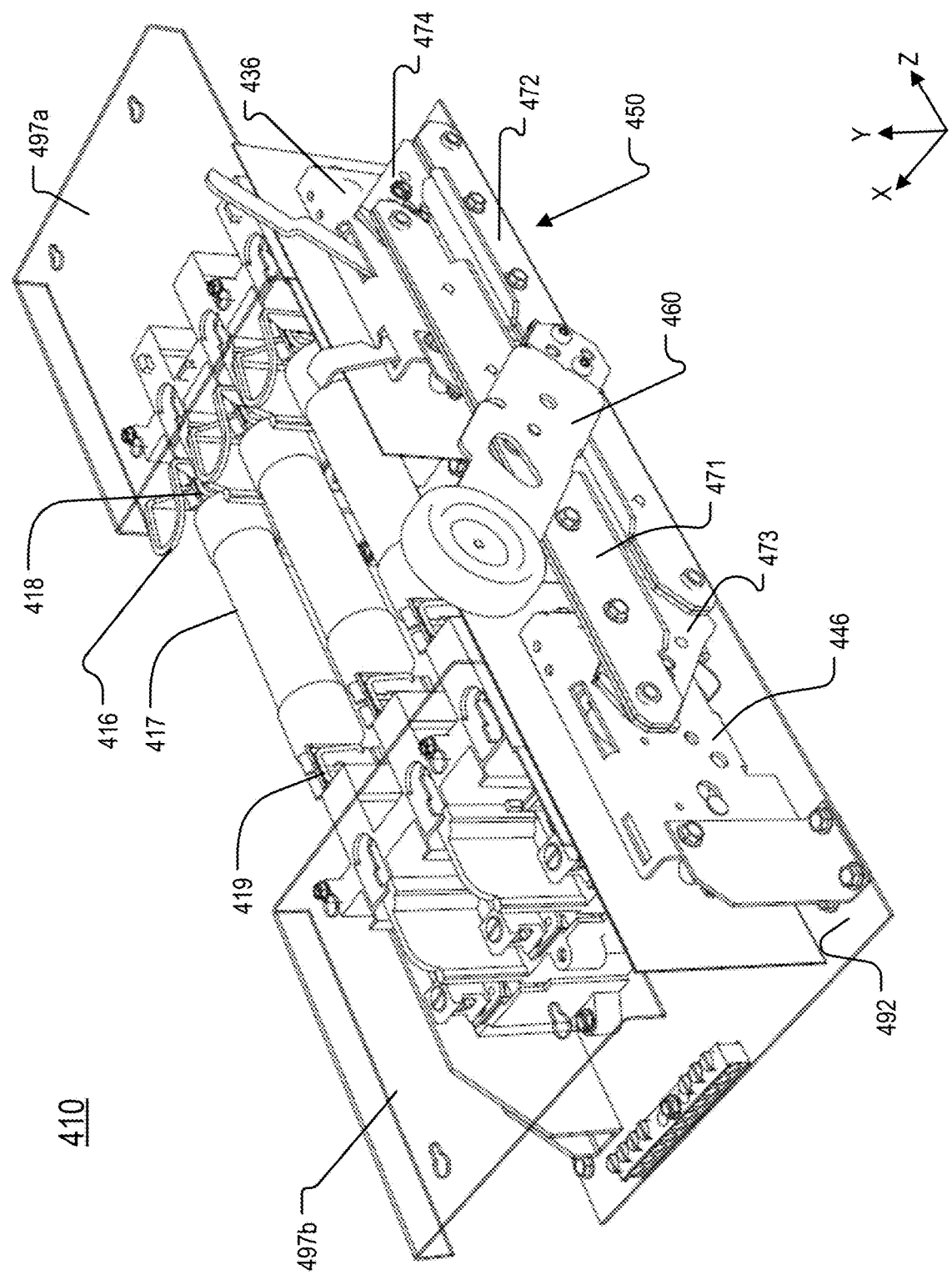
Figure 4C:
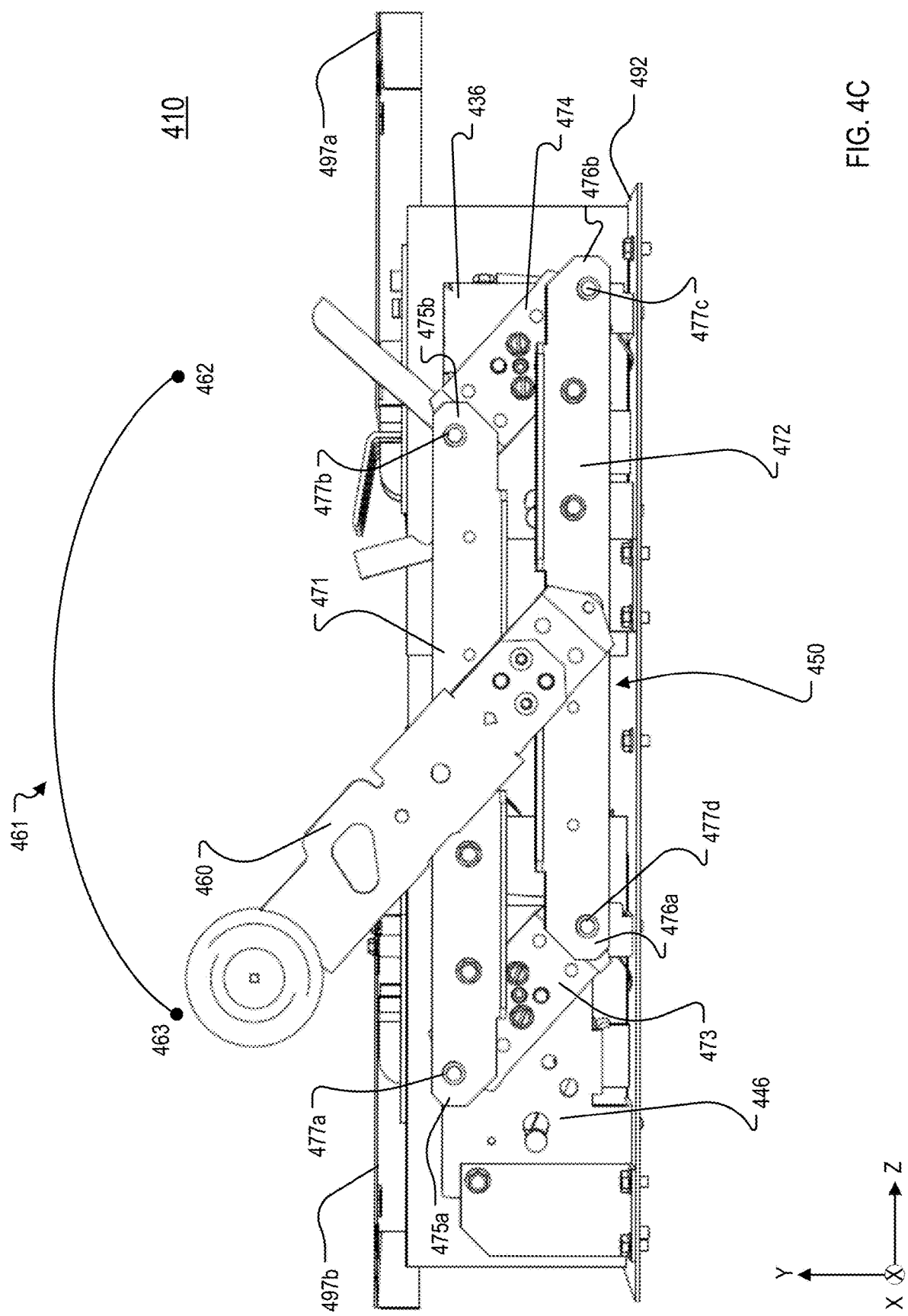
Figure 4D:
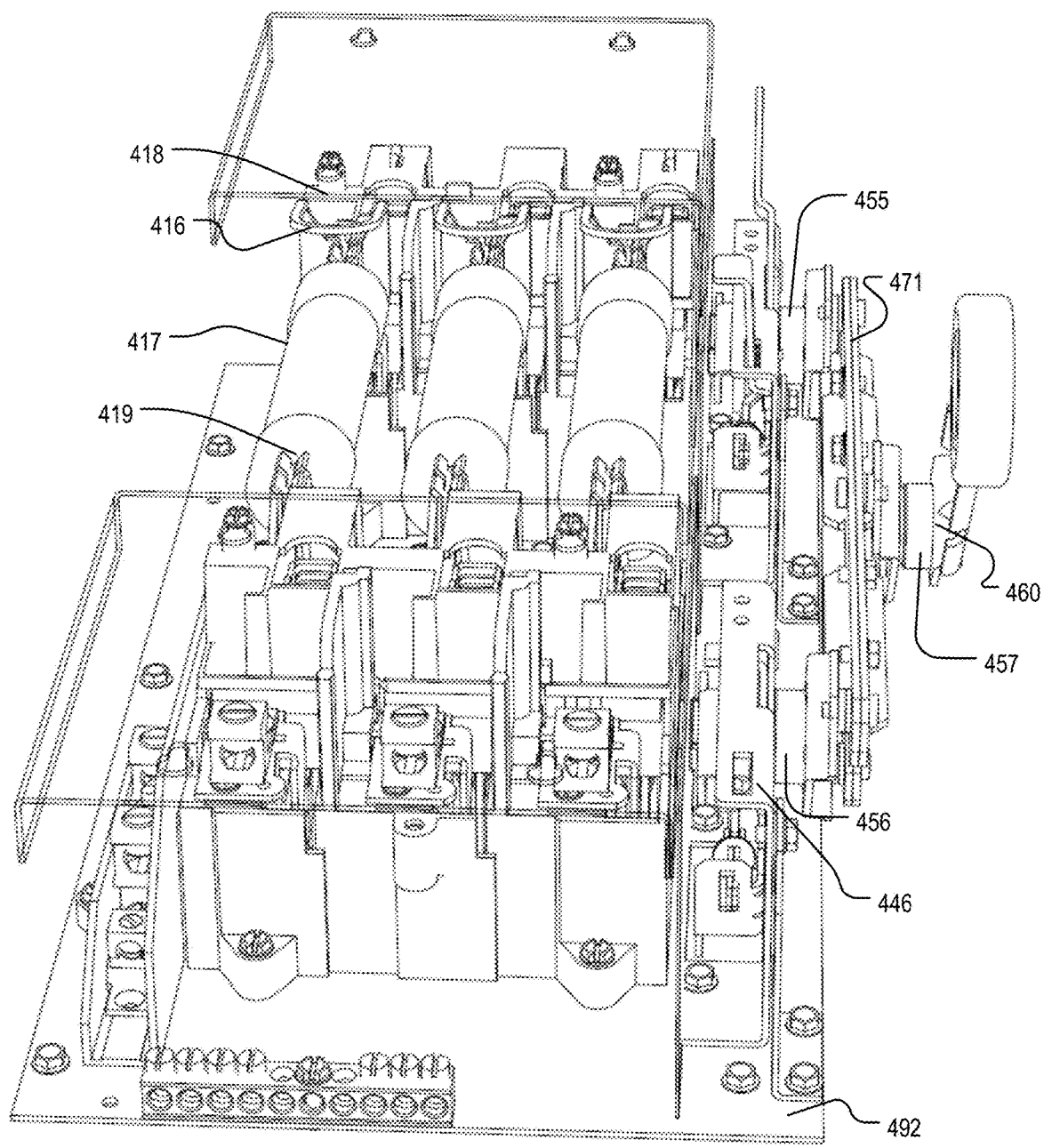
Figure 5:
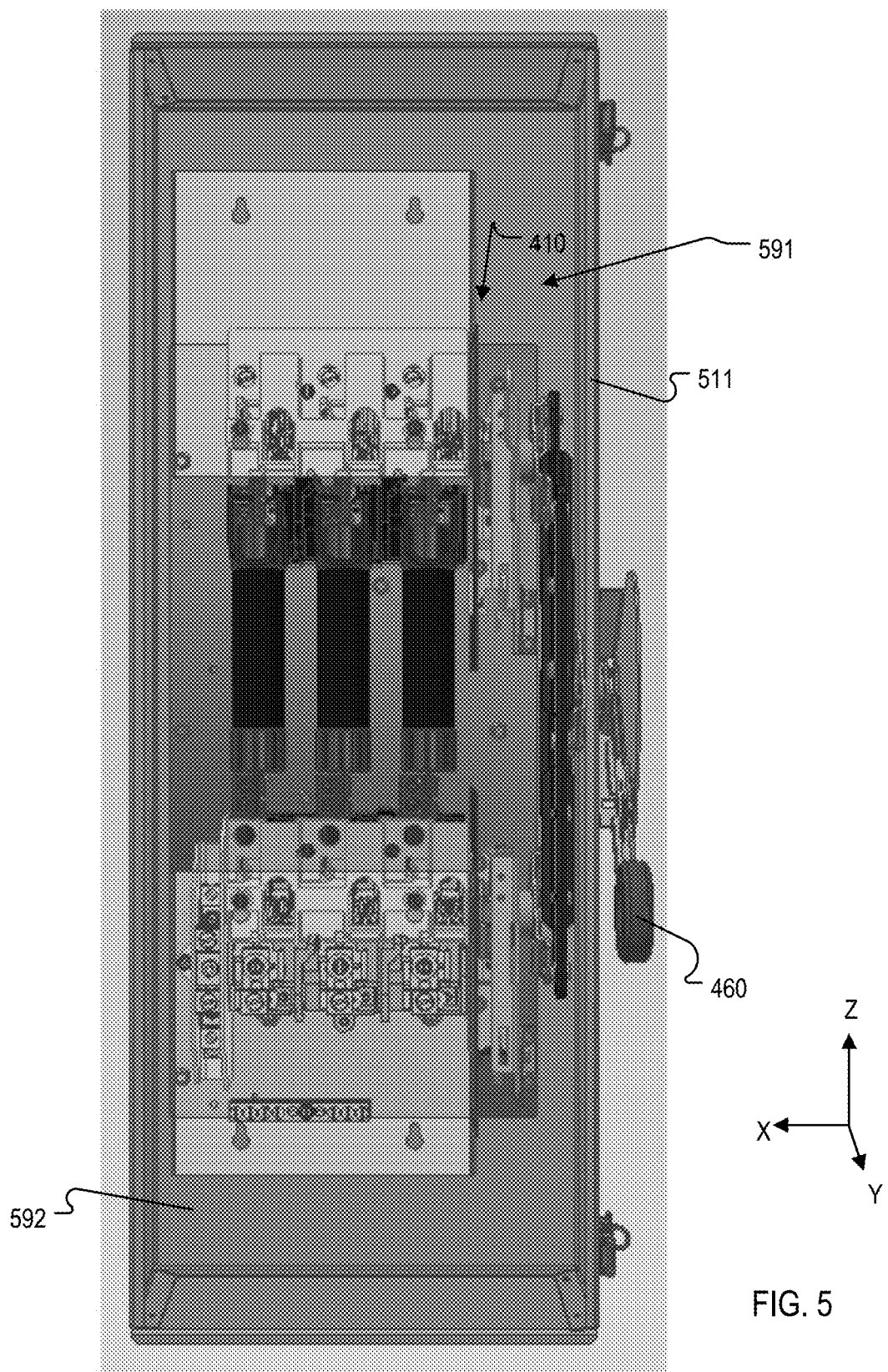
FIG. 5 is a front perspective view of the switching system of FIGS. 4A-4D when placed in an interior of an enclosure.

FIGS. 4A-4D show a switching system 410. The switching system 410 is another example implementation of the switching system 110. FIG. 4A is a front view of the switching system 410. FIG. 4B is a side perspective view of the switching system 410. FIG. 4C is a side view of the switching system 410. FIG. 4D is a bottom-front perspective view of the switching system 410. FIGS. 4A-4D show the switching system 410 without an enclosure, but the switching system 410 may be placed in an enclosure, as shown in FIG. 5.

Referring to FIGS. 4A-4D, the switching system 410 includes a fuse holding assembly 415 between a source-side switching apparatus 430 and a load-side switching apparatus 440. The fuse holding assembly 415 includes three fuse clips 416 (only one of which is labeled). Each fuse clip 416 holds one fuse device 417 (only one of which is labeled). The source-side switching apparatus 430 is a three-phase double-break, double-make switch and may be similar to the source-side switching apparatus 230 (FIG. 2A). The load-side switching apparatus 440 is a three-phase double-break, double-make switch and may be similar to the load-side switching apparatus 240 (FIG. 2A). Although not shown in FIGS. 4A-4D, each of the source-side switching apparatus 430 and the load-side switching apparatus 440 includes a shaft that extends in the X direction and moveable contacts on the shaft. The switching apparatus 410 also includes a shield 497a over the source-side switching apparatus 430 and a shield 497b over the load-side switching apparatus 440.

The fuse holding assembly 415 includes three first fuse terminals 418, each of which is electrically connected to one phase of the source-side switching apparatus 430, and three second fuse terminals 419, each of which is electrically connected to one phase of the load-side switching apparatus 440. For simplicity, only one first fuse terminal 218 is labeled and only one second fuse terminal 219 is labeled.

The switching system 410 also includes a linking interface 450 that is coupled to the source-side switching apparatus 430 and the load-side switching apparatus 440, and an operating handle 460 that is coupled to the linking interface 450. The operating handle 460 has two stable positions, each of which corresponds to one of two stable positions of the linking interface 450 and one of two states of the switching apparatuses 430 and 440. The operating handle 460 has a range of motion along an arc 461 (FIG. 4C) between endpoints 462, 463 in the Y-Z plane, and the two stable positions are at the two endpoints 462, 463 of the arc 461.

Moving the operating handle 460 from one position to the other changes the state of the source-side switching apparatus 430 and the state of the load-side switching apparatus 440 simultaneously. In this way, the fuse holding assembly 415 may be electrically isolated with a single motion of the operating handle 460 even under bi-directional current flow conditions.

The linking interface 450 is similar to the linking interface 350. Referring to FIG. 4C, the linking interface 450 includes a first link 471 and a second link 472 that extend in the Z direction and are separated from each other in the Y direction. The linking interface 450 also includes a third link 473 and a fourth link 474. The third link 473 is connected to a first end 475*a* of the first link 471 and to a first end 476*a* of the second link 472 at respective pivot points 477*a* and 477*d*. The fourth link 474 is connected to a second end 475*b* of the first link 471 and a second end 476*b* of the second link 472 at respective pivot points 477*b* and 477*c*.

Referring also to FIGS. 4A and 4B, the third link 473 is mounted to a hub 456, and the fourth link 474 is mounted to a hub 455. The hub 456 is attached to an end of a shaft that drives the moveable contacts of the load-side switching apparatus 440. The hub 455 is attached to an end of the shaft that drives the moveable contacts of the source-side switching apparatus 430.

The source-side switching apparatus 430, the fuse holding assembly 415, the load-side switching apparatus 440 are mounted to a base 492 in a fixed spatial relationship to each other. The base 492 is a plate that extends in the X-Y plane. The switching system 410 also includes housings 436 and 446, each of which enclose a spring assembly such as shown in FIG. 4E.

Figure 4E:
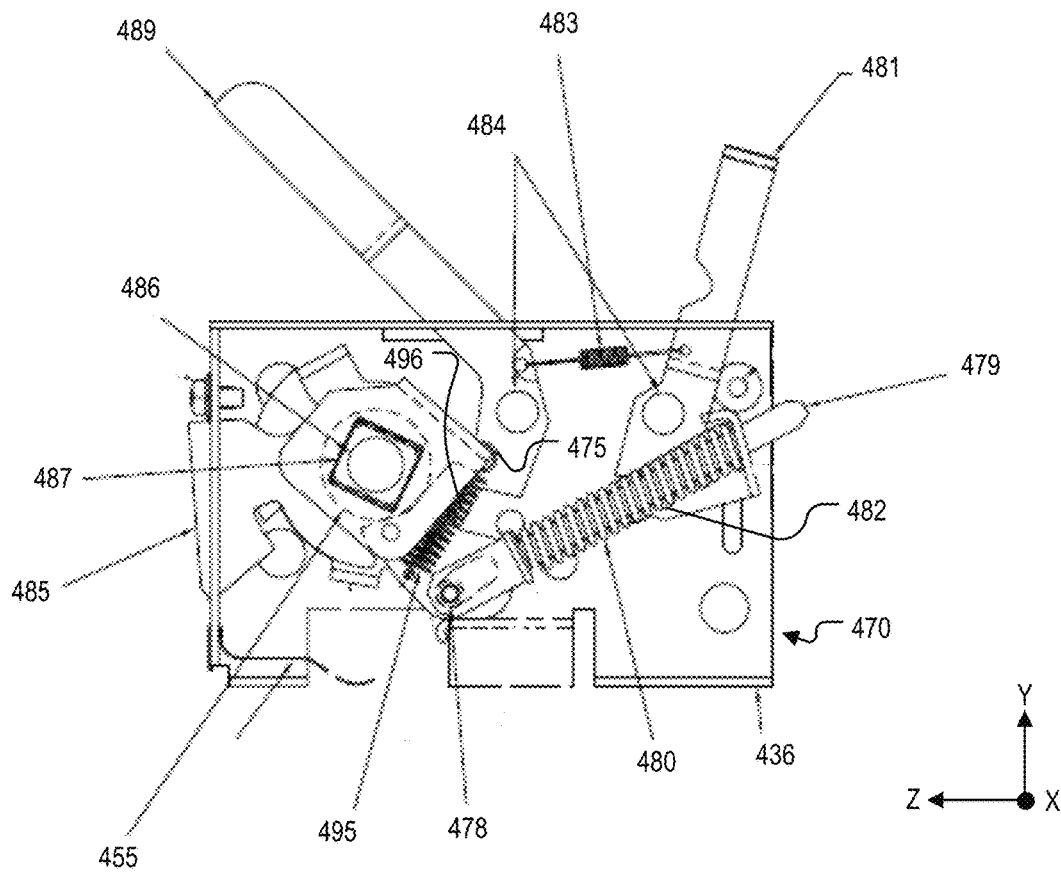
FIG. 4E is a side view of the interior of an example of a housing and a spring assembly that may be used in the switching system of FIGS. 4A-4D.
Figure 4F:
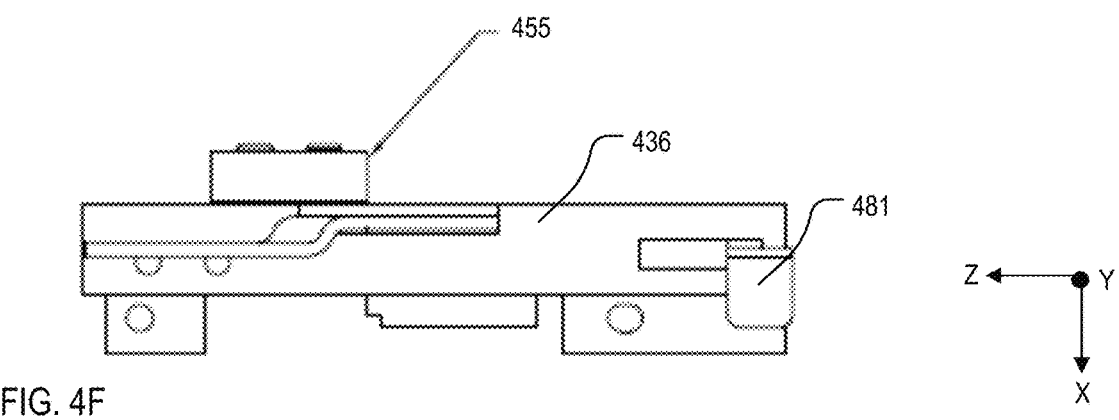
FIG. 4F is another view of the housing of FIG. 4E.

Referring also to FIGS. 4E and 4F, the housings 436 and 446 enclose and hold a spring assembly. FIG. 4E is a side view of the interior of the housing 436 and a spring assembly 470, which is an example of a spring assembly that may be in each housing 436 and 446. FIG. 4F shows the housing 436 and the hub 455. In the example of FIG. 4E, the spring assembly 470 is in the configuration corresponding to the source-side switching apparatus 430 being open or OFF.

The hub 455 is accessible from an exterior of the housing 436. The hub 455 is attached to a hub connector 486 that passes through the housing 436. The hub connector 486 is attached to the coupling plate 485 such that the hub 455 and the coupling plate 485 are mechanically coupled and rotate together. The coupling plate 485, the hub connector 486, and the hub 455 can rotate in the Y-Z plane relative to the housing 436. The coupling plate 485 defines a feature 487 that is configured to connect to the shaft of the source-side switching apparatus 430 such that the shaft rotates with the hub 455 and coupling plate 485. The feature 487 is shown as a recess that receives and end of the shaft or an element that is connected to the shaft. However, the feature 487 may be in any form suitable for connection to the shaft and/or to an element mounted to the shaft.

The spring assembly 470 also includes a first lever 489 that is connected to the coupling plate 485 at a pivot point 475, and a first spring 496 that is connected to the pivot point 475 and the coupling plate 485 at an attachment point 495. The spring assembly 470 also includes a second lever 479 that is attached to the coupling plate 485 at a pivot point 478. A second spring 480 is on the second lever 479. The spring assembly 470 also includes a third lever 481 that is attached to the second lever 479 at a pivot point 482. A third spring 483 is attached to the first lever 489 and the third lever 481.

The first lever 489 and the third lever 481 are attached to the housing 436 at pivot points 484. The first lever 489 and the third lever 481 can rotate in the Y-Z plane relative to the housing 436. The pivot point 475 connects the coupling plate 485 to the first lever 489 and allows the plate 485 and lever 489 to rotate in the Y-Z plane relative to each other, but the pivot point 475 is not attached to the housing 436. The pivot point 482 connects the third lever 481 and the second lever 479 and allows the lever 481 and the lever 479 to rotate in the Y-Z plane relative to each other, but the pivot point 482 is not attached to the housing 436. The pivot points 475, 482, and 484 are any type of device that connects two or more elements and enables rotation between the two or more connected elements. For example, the pivot points 475, 482, and 484 may be rivets.

When the spring assembly 470 is in the OFF position (shown in FIGS. 4A-4E), the second spring 480 is in an expanded state and the levers 489, 479, 481 are in their respective first positions. To transition the spring assembly 470 to the ON position, the operating handle 460 (FIGS. 4A-4D) is moved from the endpoint 463 to the endpoint 462. As the operating handle 460 moves along the arc, the hub 455 rotates clockwise in the Y-Z plane (FIG. 4C). The rotation of the hub 455 causes the third link 473 and the fourth link 474 to rotate in the clockwise direction in the Y-Z plane, which causes the first link 471 to move in the Z direction and the second link 472 to move in the −Z direction. The rotation of the third link 473 rotates the hub 455 and the coupling plate 485 in the clockwise direction in the Y-Z plane (which is the counterclockwise direction in FIG. 4E) and rotates the shaft of the source-side switching apparatus 430 to close the source-side switching apparatus 430.

Referring to FIG. 4E, the rotation of the hub 455 causes the coupling plate 485 to rotate in the counterclockwise direction, pulling the first lever 489 and the second lever 479 in the counterclockwise direction. The second spring 480 compresses until the second lever 479 extends in the Z direction and then expands as the second lever 479 continues in the clockwise direction, and the coupling plate 485 rotates counterclockwise until the first spring 496 is compressed and the operating handle 460 is at the endpoint 462.

The housing 446 also includes a spring mechanism that operates in the same manner and at the same time as the spring assembly 470. The hub 456 is rotated in the clockwise direction in the Y-Z plane (FIG. 4C) at the same time as the hub 455 is rotated such that the shaft in the load-side switching apparatus 440 is rotated to close the load-side switching apparatus 440 at the same time as the source-side switching apparatus 430.

FIG. 5 is a front perspective view of the switching system 410 in an interior 591 of an enclosure 511. The enclosure 511 houses and contains the switching system 410. The enclosure 511 includes a base 592 that extends in the X-Z plane. The switching system 410 is mounted to the base 592 such that the enclosure 511 and the switching system 410 may be mounted as a unit to a support such as, for example, a wall or pole. The enclosure 511 is shown without a cover or a door such that the interior 591 is exposed. However, the enclosure 511 may include a door or other removable cover that allows access to the interior 591 when removed and protects the interior 591 and encloses the switching system 410 when in place.

These and other implementations are within the scope of the claims.

What is claimed is:

1. A switching system comprising:
   a first switching apparatus;
   a second switching apparatus;

a holding assembly between the first switch apparatus and the second switch apparatus, the holding assembly configured to hold one or more fuse devices; and a linking interface connected to the first switching apparatus and the second switching apparatus, the linking interface having only two stable interface positions: a first interface position and a second interface position, wherein, transitioning the linking interface from the first interface position to the second interface position simultaneously changes a state of the first switching apparatus and a state of the second switching apparatus.

2. The switching system of claim 1, further comprising a switch control coupled to the linking interface, and wherein the switch control is operable to transition the linking interface between the two stable interface positions.

3. The switching system of claim 2, wherein the switch control comprises a handle that is moveable between two stable handle positions: a first handle position and a second handle position; and wherein, moving the handle from the first handle position to the second handle position transitions the linking interface from the first interface position to the second interface position, and moving the handle from the second handle position to the first handle position transitions the linking interface from the second interface position to the first interface position.

4. The switching system of claim 3, wherein the linking interface comprises: a first hub coupled to the first switching apparatus, a second hub coupled to the second switching apparatus, and a middle hub coupled to the handle; and a link assembly coupled to the first hub, the second hub, and the middle hub.

5. The switching system of claim 4, wherein the link assembly comprises a first link and a second link; and each of the first link and the second link extends from a first end to a second end.

6. The switching system of claim 5, wherein the first link and the second link extend parallel to each other.

7. The switching system of claim 6, wherein the linking interface further comprises a third connector connected to the first end of the first link at a first pivot point and to the first end of the second link at a second pivot point; and a fourth connector connected to the second end of the first link at a third pivot point and to the second end of the second link at a fourth pivot point.

8. The switching system of claim 7, wherein the first hub is coupled to the third connector, and the second hub is coupled to the fourth connector.

9. The switching system of claim 1, wherein each of the first switching apparatus and the second switching apparatus comprises one or more double make, double break switches.

10. The switching system of claim 9, wherein each of the double make, double break switches comprises a shaft that rotates in response to movement of the linking interface and two blades mounted on the shaft.

11. The switching system of claim 1, further comprising an electrically conductive piece electrically connected to the holding assembly.

12. The switching system of claim 1, wherein the first switching apparatus and the second switching apparatus are in an ON state when the linking interface is in the first interface position; and the first switching apparatus and the second switching apparatus are in an OFF state when the linking interface is in the second interface position.

13. The switching system of claim 1, wherein the first switching apparatus and the second switching apparatus are in an OFF state when the linking interface is in the first interface position; and the first switching apparatus and the second switching apparatus are in an ON state when the linking interface is in the second interface position.

14. The switching system of claim 1, further comprising a housing that encloses the first switching apparatus, the second switching apparatus, the holding assembly, and the linking interface.

15. The switching system of claim 1, further comprising a support, and wherein the first switching apparatus, the second switching apparatus, and the holding assembly are mounted to the support.

16. The switching system of claim 1, further comprising at least one fuse device.

17. The switching system of claim 1, wherein the holding assembly comprises one or more fuse clips, each fuse clip configured to hold one fuse device.

* * * * *